(12) United States Patent
Willibald

(10) Patent No.: US 6,347,504 B1
(45) Date of Patent: Feb. 19, 2002

(54) VEHICLE WITH A WORKING DEVICE, ESPECIALLY WITH A CHOPPING DEVICE

(75) Inventor: Artur Otto Willibald, Uberlingen (DE)

(73) Assignee: AHWI Maschinenbau GmbH, Herdwangen (DE)

( * ) Notice: Subject to any disclaimer, the term of this patent is extended or adjusted under 35 U.S.C. 154(b) by 0 days.

(21) Appl. No.: 09/479,809

(22) Filed: Jan. 7, 2000

(30) Foreign Application Priority Data

Jan. 11, 1999 (DE) .................................. 299 00 245 U

(51) Int. Cl.[7] .............................................. A01D 34/30
(52) U.S. Cl. ....................................................... 56/257
(58) Field of Search ........................... 56/6–15.1, 15.2, 56/15.6, 17.5, 13.6, 16.4 R, 257, 264; 180/53.4; 280/419, 442; 172/518, 520, 105, 521, 527

(56) References Cited

U.S. PATENT DOCUMENTS

| 5,272,859 A | * | 12/1993 | Pruitt et al. ............... 56/15.2 |
| 5,421,145 A | * | 6/1995 | Pruitt et al. .................. 56/6 |
| 5,901,533 A | * | 5/1999 | Ermacora et al. ............ 56/6 |
| 6,003,291 A | * | 12/1999 | Ermacora et al. ............ 56/6 |

* cited by examiner

Primary Examiner—Robert E. Pezzuto
(74) Attorney, Agent, or Firm—Bachman & LaPointe, P.C.

(57) ABSTRACT

A vehicle with a working device, especially a chopping device, with a drive element, which is connected to an output shaft of the vehicle, whereby the transmission element can be moved on bearings and the working device can change position with respect to the vehicle.

8 Claims, 2 Drawing Sheets

VEHICLE WITH A WORKING DEVICE, ESPECIALLY WITH A CHOPPING DEVICE

BACKGROUND OF THE INVENTION

The present invention concerns a vehicle with a working device, especially a chopping device, with a drive element, which is connected to an output shaft of the vehicle, whereby the transmission element can be moved on bearings and the working device can change position with respect to the vehicle.

Vehicles of this kind are known on the market and are in use in the most varied shapes and versions. Often towing vehicles, especially tractors and similar units, are used to pull appropriate working devices, such as, e.g., chopping devices and mulching and clearing machines, for the most various fields of application.

In this case, mulching machines, e.g., are used for many forestry purposes, surface clearing, and similar chopping, and also for chopping stumps or even cleared roots. Even mulching of hardwood is possible.

Since work is done using very high torques, control of the drive shaft is of critical importance for the process. Since positions for using such working devices often change according to the application, the corresponding angular drive-shaft relationships also change. This often leads, when the drive shaft is not controlled correctly, to undesirable oscillations when working devices of certain kinds are operated. Non-uniform rotary motions between output and drive can also arise through imprecise control of the drive shaft, so that in this case all components, such as universal shafts and especially their bearings, are subject to high loads.

SUMMARY OF THE INVENTION

The present invention is based on the task of improving the uniformity of the rotary motion of the drive shaft, so that oscillations and vibrations caused by the drive geometry of the vehicle are reduced and should be avoided in every operating position of the working device.

The fact that at least one transmission rod extends from the transmission element in the direction of the vehicle and is attached with a holding device so as to be movable about a joint and that the joint is maintained at approximately the same distance from the connection to the drive shaft or the shaft of the transmission rod during all movements of the working device leads to a solution to this task.

In the present invention, a drive rod is connected to a drive element mounted on the vehicle. Advantageously, a joint is provided at one end of the drive rod, which is connected to a holding device. The holding device is advantageously attached directly or indirectly to the vehicle. Here, a holding arm extends advantageously upward from the holding device, from which a swivel-mounted connecting element connects downward and produces a connection with the joint of the drive rod.

The drive element, in particular the drive rod, permits the connecting element to move only on an arc path.

Here, it has turned out to be especially advantageous to provide the joint specifically in the middle between the two connections of the output shaft and the shaft of the drive element. In particular, arranging the joint in the middle position of the joint as a connection point between connecting element and drive rod should form an angle, á, between the drive shaft and the attachment of the driven shaft, corresponding approximately to the angle, â, between the attachment and the drive shaft. In this way, a so-called W-bend is formed between the drive shaft of the vehicle and the shaft of the working device and a rotating drive shaft mounted on bearings in the middle. In every operating state of the working device, angle á is approximately equal to angle â. In this case, a positive or even a negative W-bend is formed, with angles á and â always corresponding to each other.

In this way, it is always provided in operation that the drive shaft permits a very uniform rotary motion and thereby a transfer of the torque. Thus minimal oscillations and vibrations appear.

BRIEF DESCRIPTION OF THE DRAWINGS

Other advantages, characteristics, and details of the invention can be seen from the following description of a preferred embodiment example and from the drawings; these show in.

DETAILED DESCRIPTION

Figure 1:
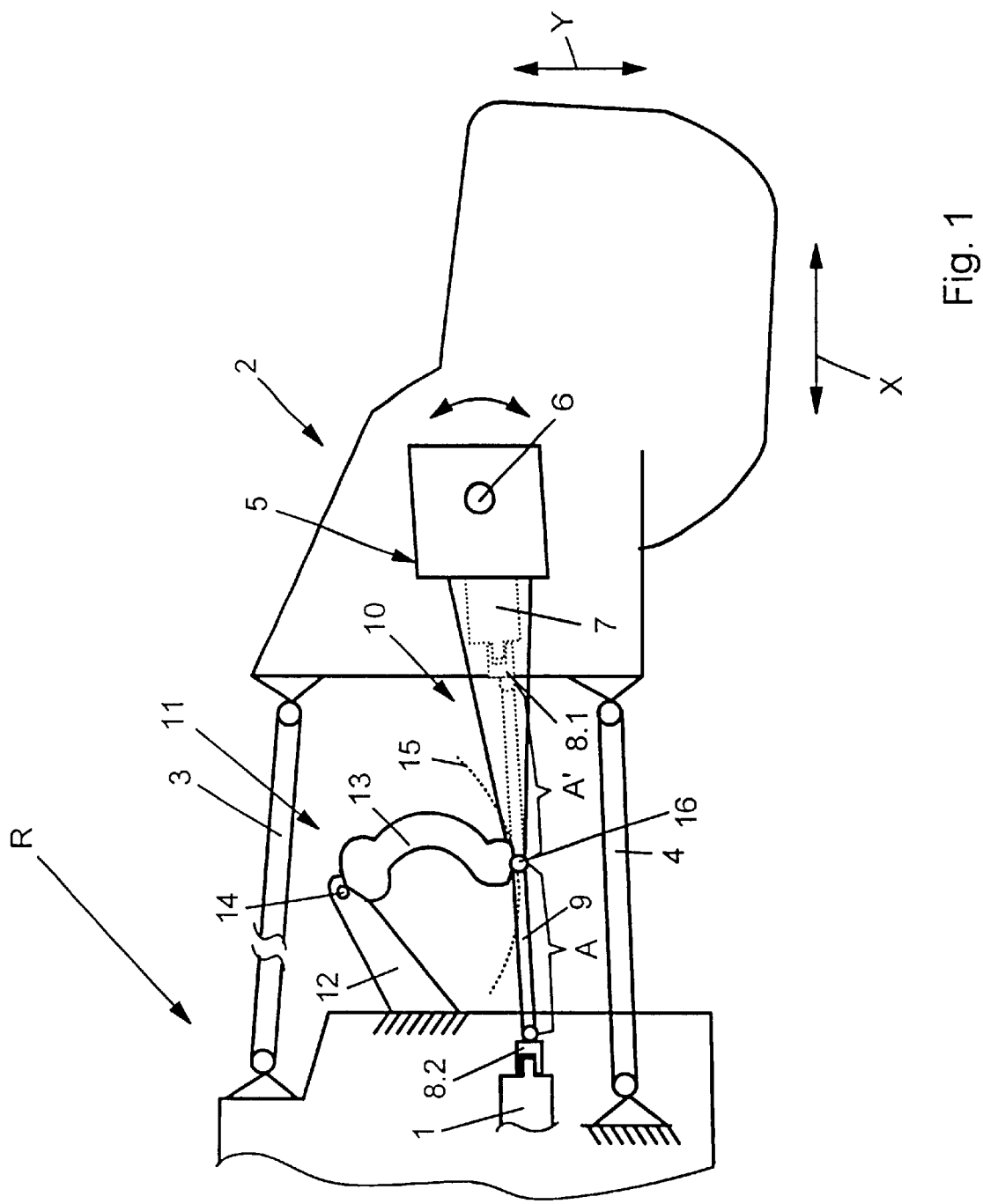
FIG. 1, a schematically presented top view of a vehicle according to the invention, with an attached working device in a rest position.

According to FIG. 1, a vehicle, R, according to the invention, which is only shown here partially schematically, has an output shaft, 1, attached advantageously at the rear. The vehicle, R, is not shown in more detail here. It can be a tractor or a towing vehicle.

Figure 2:
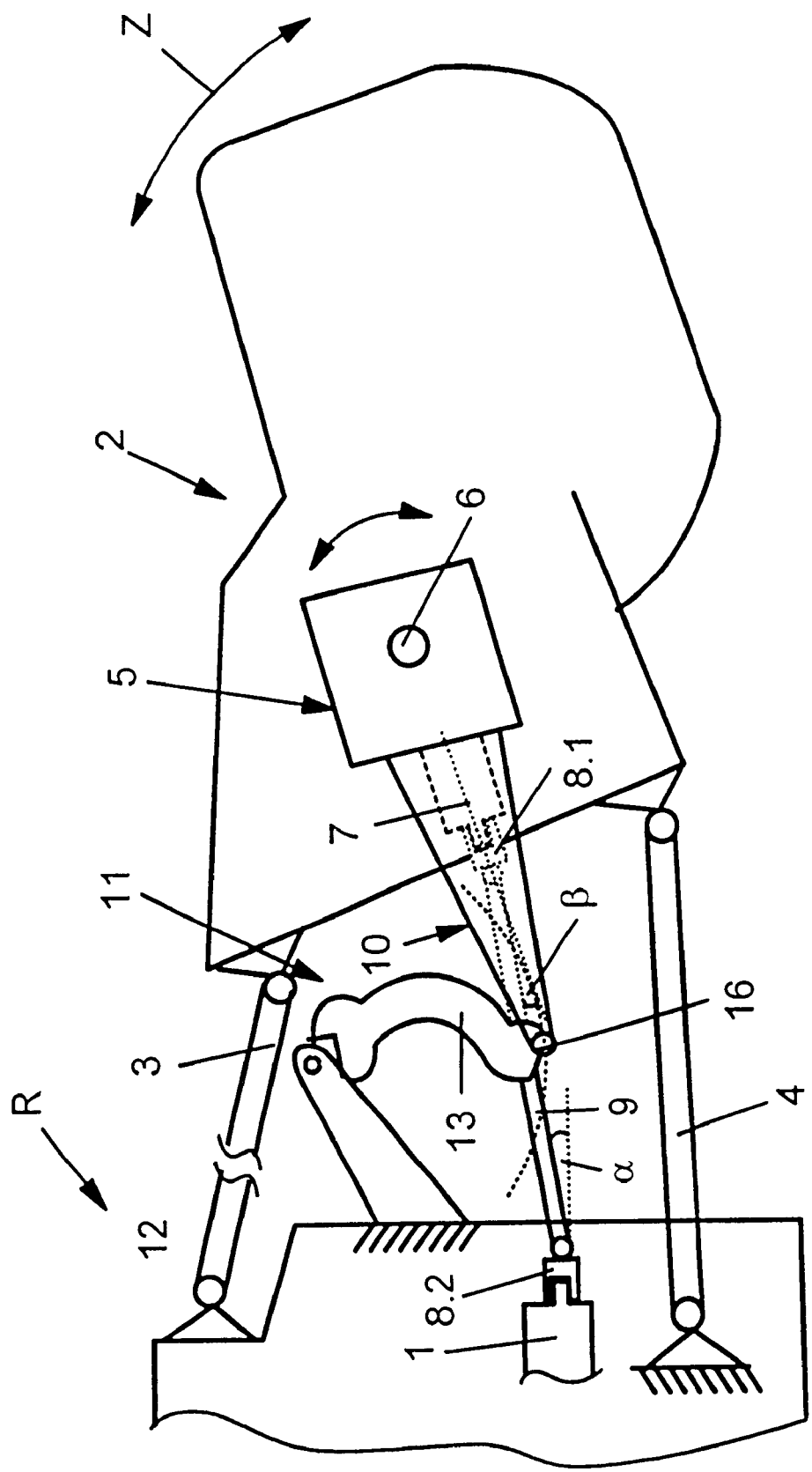
FIG. 2, a schematically presented top view of the vehicle, with a working device according to FIG. 1 in a possible operating position.

A working device, 2, is coupled to this vehicle, R, advantageously through an upper rod, 3, and a lower rod, 4. The upper rod, 3, and the lower rod, 4, can be raised, lengthened, shortened, or swiveled in any desired manner. In this way, the working device, 2, can be moved in the double-arrow y or x direction or even swung in the double-arrow z direction, as indicated in FIG. 2. This is necessary when the working device, especially a chopping device or machine is driven into our out of the ground to be worked. Different ways of working can require working with different angles set.

The working device, 2, has a transmission element, 5, which is arranged so that it can be rotated about a fulcrum, 6, in particular with respect to the working device, 2. To this transmission, 5, drive shafts (not shown in greater detail) are connected, which likewise drive elements of the working device that are not numbered.

A shaft, 7, extends from the transmission element, 5. There are corresponding connections, 8.1, 8.2, on the output shaft 1, and the shaft, 7, each of which is swivel-mounted on a drive shaft, 9. Through drive shaft 9, a drive motion in the drive element, 5, is transmitted to operate the working device, 2. Drive shaft, 9, is advantageously formed so that it can changed in length.

From the drive element, 5, a drive rod, 10, extends to the vehicle, R, in particular to the output shaft, 1, of the vehicle, R. According to the invention, the drive rod, 10, is connected to the vehicle, R, through a holding device, 11. The holding device, 11, has a holding arm, 12, that is essentially attached firmly to the vehicle, R, on which a swivel-mounted connecting element, 13, extends downward. The holding arm, 12, points upward from the vehicle, R. At the other end, the connecting element, 13, is connected to the drive rod, 10, and is swivel-mounted on it. Here, the connecting element, 13, is advantageously arranged so as to swivel about a connecting joint and moves on an arc path, 15, as indicated with dots in FIG. 1.

It is important, however, in the present invention that a joint, 16, represents a swivel-type connection between the connecting element, 13, and the drive rod, 10.

Here, the joint, 16, is arranged essentially at distances, A, A', from the connections, 8.1, 8.2. The joint, 16, is approximately in the middle of drive shaft 9. But it can also, as can be seen in FIG. 2 in particular, lie outside the region of drive shaft 9. It is important, however, that the distances, A, A', to the connections, 8.1, 8.2, be formed or selected so as to be approximately equal.

Through a movement of the working device, 2, as shown in FIG. 2 in particular, the drive rod, 10, remains essentially held in its position by the connecting element, 13, and it can only move on arc path, 15.

By this means, an angle, á, between the output shaft, 1, and connection 8.2, and drive shaft 9, is formed that corresponds approximately to an angle, â between the shaft, 7, and connection 8.1 and drive shaft 9. It is critical here that the angles between the two joints and drive shaft 9, always stay approximately equal. A so-called W-bend is formed in drive shaft 9. This has the effect that a rotary motion of drive shaft, 3, is transmitted uniformly. The greater the angular difference between á and â is the less uniform is the rotary motion of drive shaft 3. It is therefore of essential importance that through an arrangement corresponding essentially to what has been described above, uniform control of the holding device, 11, is provided in any desired position of the working device, 2, that generates equal relationships between angles á and â in any operating state.

What is claimed is:

1. In combination, a vehicle having an output shaft and a working device, a plurality of rod means for mounting the working device on the vehicle to allow for movement of the working device horizontally, vertically and pivotably; a transmission element on the working device, an input shaft extending from the transmission element and connected to the output shaft of the vehicle by a drive shaft, and a holding device mounted on the vehicle and connected to the drive shaft at a joint substantially equidistant between the input shaft and the output shat whereby the working device pivots about the joint in an arc movement in a chopping action.

2. A vehicle according to claim 1, wherein the holding device has a holding arm extending at an angle from the vehicle.

3. A vehicle according to claim 2, wherein at one end of the holding arm a connecting element is connected with a swivel mount.

4. A vehicle according to claim 3, wherein the connecting element is connected to the drive rod with a swivel mount at the other end.

5. A vehicle according to claim 2, wherein the holding arm extends from the vehicle at an upward angle.

6. A vehicle according to claim 3, wherein the connecting element extends downward from the holding arm.

7. A vehicle according to claim 3, wherein the connecting element is curved.

8. A vehicle according to claim 7, wherein the joint can move on an arc path corresponding to a radius of curvature of the connecting element.

* * * * *